United States Patent [19]
Blank

[11] 3,762,981
[45] Oct. 2, 1973

[54] QUICK RELEASE SAFETY WINDSHIELD

[75] Inventor: Kurt Blank, Haselsteig, Germany

[73] Assignee: Saint-Gobain, Boulevard Victor Hugo Neuilly sur Seine, France

[22] Filed: Mar. 15, 1971

[21] Appl. No.: 124,222

[30] Foreign Application Priority Data
Mar. 16, 1970 France .............................. 7009212

[52] U.S. Cl. .................... 161/40, 161/44, 161/145, 161/199, 161/209, 156/99, 156/106
[51] Int. Cl. ...................... B32b 17/10, B32b 31/12
[58] Field of Search .................... 161/199, 201, 209, 161/208, 145, 39, 44, 40; 156/308, 99, 104, 106

[56] References Cited
UNITED STATES PATENTS

| | | | |
|---|---|---|---|
| 3,630,812 | 12/1971 | Bruckner et al. ............... | 161/199 X |
| 2,258,991 | 10/1941 | McNally ............................ | 161/201 |
| 3,445,326 | 5/1969 | Hurst .................................. | 161/208 |
| 2,184,876 | 12/1939 | Sherts ................................ | 161/199 |
| 3,341,399 | 9/1967 | Hazdra et al. ...................... | 161/199 |
| 3,455,754 | 7/1969 | Buzzell et al. ...................... | 156/99 |
| 2,047,253 | 7/1936 | Brooks ............................ | 161/201 X |

*Primary Examiner*—Daniel J. Fritsch
*Attorney*—John L. Seymour and Arthur W. Dew

[57] ABSTRACT

A quick release windshield is constructed of a thin sheet of glass, an interlayer of poly-vinyl butyral and a surface layer of a cellulose aceto-butyrate or cellulose tripropionate. The cellulose ester is preferably mounted on the butyral by means of a transparent adhesion-promoter such as tin-II-chloride. For use in places where the organic layer is apt to be marred, its surface is hardened by the application of a coating of an organic polysiloxane. The glass projects beyond the organic layers and serves as the only major mounting means.

11 Claims, 4 Drawing Figures

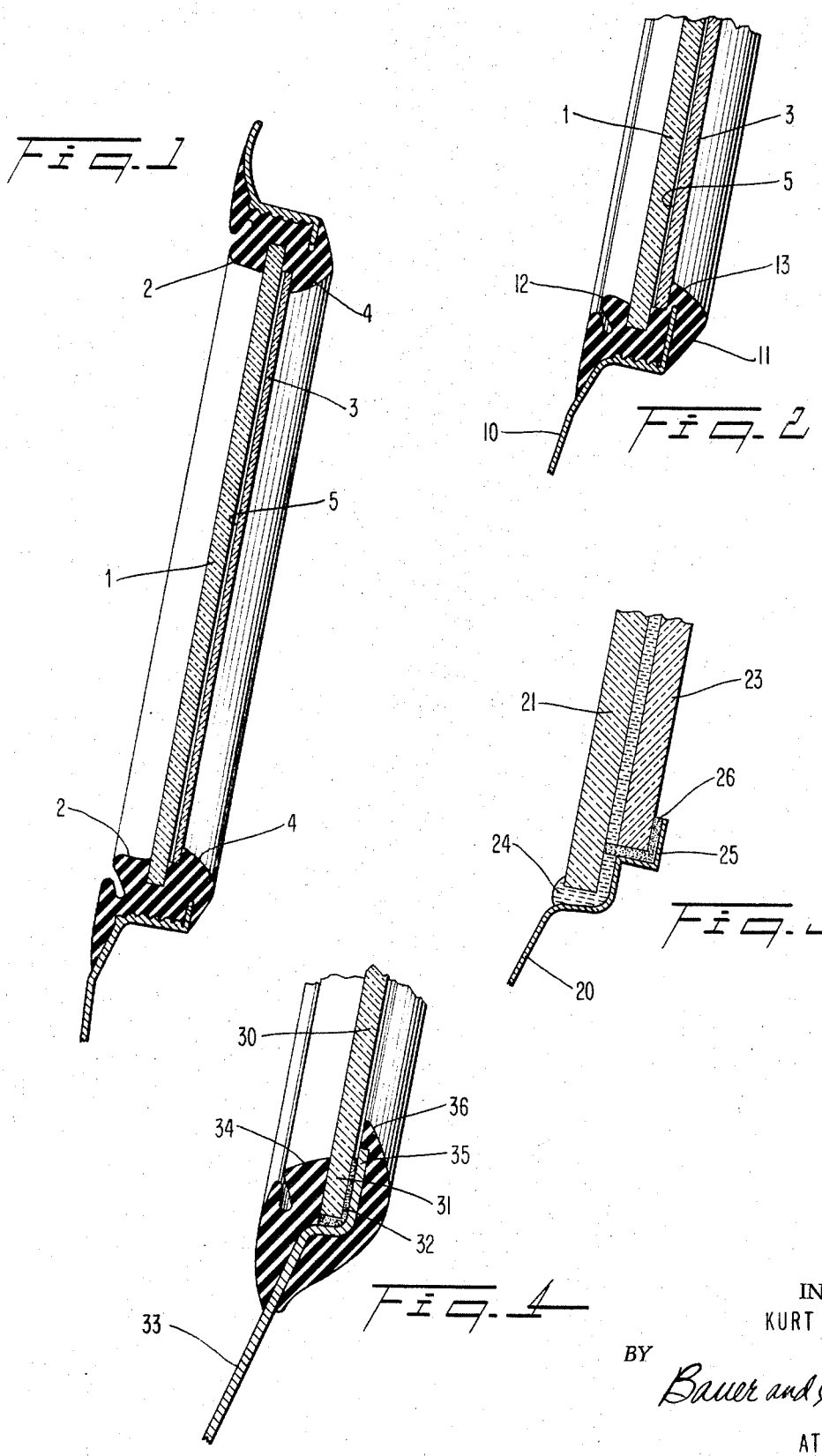

QUICK RELEASE SAFETY WINDSHIELD

This invention relates to a window of novel construction which is particularly adapted to use as an automobile windshield and which will be described in that use without limiting the generality of its application. The invention is an improvement on that of United States application Ser. No. 794,152 filed Jan. 27, 1969, now U.S. Pat. No. 3,630,812, issued Dec. 28, 1971 and which is assigned to the same assignee. The invention described in the prior application relates to a windshield which gives way readily after shock, such as projection of a body against it during an automobile accident, and which yields at the edges, not at the center, constituting a material protection to occupants of the vehicle.

The accompanying drawings illustrate that prior invention and the following description is taken from the prior specification:

FIG. 1 shows in section the structure of a windshield, in accordance with the invention, constituted by a laminated sheet;

FIG. 2 represents in section a preferred mode of construction of the frame using a rubber section;

FIG. 3 represents in section another construction of the frame in the case of a fastening of the windshield by cementing directly onto the car body;

FIG. 4 is a partial, cross-sectional view of a windshield in accordance with the characteristics of the invention and consisting of a single sheet of safety glass;

As can be seen on FIG.1, the side of the novel windshield not receiving the impact directly, i.e. the outer side, consists of a sheet of silicate glass 1 held along its periphery in the frame 2. Along the side receiving the impact there is a smaller sheet 3. The latter terminates preferably, along its entire periphery, within the frame in which the sheet of silicate glass 1 has been fixed so that, contrary to the latter, it is not held tightly in the frame. In accordance with a first mode of realization, this smaller sheet 3 is made of plastic;

The sheet of silicate glass 1 is joined to the plastic material sheet 3 by means of a spacer layer 5 made of a suitable cement. This cement layer is preferably selected in such a way that it will, within the temperature range referred to above, absorb the mechanical tension stresses generated as a result of the difference of thermal expansion between the glass and the plastic material;

Considering the minimum value, required according to the invention, of the mechanical properties of the substance making up the plastic material sheet 3, this substance can be chosen from among the known plastic materials. Thus, for instance, the required conditions are satisfied in the case of an ethylene glycol polyterephthalic ester sheet of a thickness of 0.25 mm., a high molecular weight thermoplastic polycarbonate sheet of a dihydroxylated aromatic compound, in particular di-a dihenynolalkane, of a thickness of 1 mm., an amorphous polyamide sheet of bifunctional aromatic acids, in particular terephthalic acid and an alkyl substituted bifunctional aliphatic amine, in particular diamine hexamethylene, of a thickness of 0.25 mm. or even a polyvinyl chloride sheet free of plasticizer, of a thickness of 0.5 mm.;

The sheet 3, of smaller size, can likewise be of silicate glass, provided one sees to it that the interpolated plastic layer 5 and the sheet of silicate glass 3, or the laminated unit made up of the elementary sheets 1, 3, and 5, is endowed in its median zone with the strength required for perforation. The sheet of glass 1 has a thickness of 2 to 8 mm. and the sheet of glass 3 has a thickness of 0.1 to 3 mm. The interpolated plastic layer 5 consists of polyvinyl butyral and has a thickness of at least 0.7 mm.;

FIG. 2 represents another mode of realization of the frame in which the smaller size sheet 3 is firmly supported in order to prevent a collapse of the windshield toward the inside of the vehicle in the event of the breaking of the outer sheet of glass 1 under the effect of an impact coming from outside. To this end, the part 10 of the car body constituting the frame of the windshield is extending in order that the upper part 11 of its frame overlap the periphery of the sheet 3. The rubber section 12 has, in this area, been widened by the lip 13 which applies against the sheet 3. In this case, of course, care must be exercised in order that there should not be any adhesion between the periphery of the sheet 3 and the lip 13 of the rubber section so that, in the event of an accident, the sheet 3 can easily liberate itself from the rubber section, and move outward or forwardly;

If the use of a rubber section is dispensed with, the frame can suitably be executed on the car body, as shown in FIG. 3. In this case, the rabbet of the frame 20 is bent twice in stepwise fashion so that the outer sheet of glass 21 and the inner sheet of glass 23 are hemmed in by the steps formed in this manner. The outer sheet 21 is fixedly attached to the car body 20 along its entire periphery by means of a suitable cement 24. The inner sheet 23, on the contrary, must not be connected to the car body in any way. To this end, one can interpose between the periphery of the sheet 23 and the corresponding part 25 of the frame a suitable separating means 26;

FIG. 4 illustrates a mode of realization of a windshield in accordance with the invention, made of a single pane of safety glass. In the case of these windshields, the median area 30 consists of a silicate glass having a flexural strength of at least 50 kgf./mm.$^2$, and preferably between 50 to 100 kgf./mm.$^2$. The peripheral zone 31 has, on the contrary, a flexural strength of 20 kgf./mm.$^2$ at the most. The peripheral zone 31 is cemented onto the sheet metal 33 of the car body by means of a cement layer 32. The upper portion 35 forming the rabbet of the sheet-metal 33, which extends to face the peripheral zone 32 and which overlaps up to the median zone 30 of the sheet of glass in order to protect it from collapsing toward the inside, is not cemented to this sheet either. This holds likewise with regard to the upper portion 36 of the part of the rubber section situated on the inner side.

It will be perceived that the patent above identified relates to a safety windshield constituted of two elementary sheets of glass with an interlayer of plastic, usually polyvinyl butyral, which is weakened at its periphery so that under shock the median part is projected forward as a unit while the weak peripheral zone breaks to release it. In that windshield the exterior layer is silicate glass and the interlayer and inner layer have smaller dimensions than the layer which is fixed in the frame. Most of the interlayer and inner layer are not gripped by the frame. The plastic interlayer and the inner layer have such strength that they are not perforated by a spherical body weighing 20 kg. striking with an impact to 50 km./hr.

The prior application includes layered windshields in which the interior layer may be plastic, preferably thermoplastic, and which has a temperature acceptance between −20°C. and +40°C., a resistance to rupture of at least 5 kg·cm/cm$^2$, and a resistance to traction above 200 kg./cm.$^2$ (0.1 percent elastic limit).

It has now been discovered by the present inventor that superior windshields of the foregoing type are made when the innermost layer of the sandwich is composed of cellulose-acetobutyrate or of cellulose-tripropionate. Such novel windshields give superior results and superior protection in case of accident, particularly when the windshield includes an outer layer of silicate glass (silia-soda-lime glass for instance) when the cellulose ester has a thickness from about 0.2 to 0.5 mm., and when the plastic interlayer is composed of polyvinyl butyral having a thickness above about 0.7 mm.

It is my discovery that polyvinyl butyral does not adhere well to plastics but that cellulose esters, particularly cellulose aceto-butyrate, can be made to adhere firmly and permanently to the butyral, especially when adhesion is secured by means hereinafter to be described. An advantage of this novel windshield is that only a very thin layer of the cellulose ester need be used with the polyvinyl butyral. This produces the additional advantage that windshields comprising the very thin films of this invention are optically superior to windshields embodying the thicker sheets required by the use of other materials. These thin cellulosic sheets also import yet another advantage that they are very flexible, tend to flex rather than to rupture, and contribute much to the great resistance to perforation which is possessed by the polyvinyl butyral.

Among the cellulose esters which are suited to this use, the clarity, optical superiority and physical characteristics of cellulose aceto-butyrate make it preferred as the outer plastic layer of the three main layers of the sandwich; it has superior thermoplastic properties and superior mechanical resistance at low temperatures, e.g. those well below zero. It also has the excellent characteristic that its thermoplastic properties can be altered materially by the choice and concentration of the plasticizer which is incorporated within it, making it possible to vary its qualities for particular uses. Cellulose tripropionate is also useful but not equal in most uses to the aceto-butyrate.

The aceto-butyrate is like many plastics in being subject to scratching by abrasion and it is a part of this invention to prevent such damage. This is accomplished by applying a coating of an organo-polysiloxane to the exposed face of the plastic. These compositions are found on the market and can be used as a coating composition in aqueous or alcoholic solution. For instance, methyltrialkoxysilane is heated in water until it has formed a partial condensation product, then at a higher temperature, up to 300°C., to remove by-products, and finally below the gel point to produce the solvent soluble organo-polysiloxane which is applied to the cellulose aceto-butyrate sheet and cured. When applied and dried their optical properties are excellent and they increase the resistance of the cellulose ester to marring on the order of 5 to 10 times.

Because of their thermoplastic nature the cellulose ester and polyvinyl butyral interlayer can be welded together by heat and pressure but a superior bond is produced if adhesion A is secured by the use of a solution in alcohol of tin chloride, or an aminosilane, or an epoxy silane, for instance Union Carbide's A 1100 (gamma-aminopropyltriethoxysilane) or A187 (gamma-glycidoxypropyltrimethoxysilane). A solution of 1 to 8 percent of stannous chloride, SnCl$_2$, in ethyl alcohol is sprayed on the sheet of cellulose aceto-butyrate which is immediately applied to the polyvinyl butyral.

EXAMPLE 1

A sheet of silica-soda-lime glass of a type ordinarily employed in the manufacture of windshields, having a thickness of 2–3 mm. was bent by ordinary bending machinery with the double curvature typical of the modern windshield. To this a sheet of polyvinyl butyral 0.76 mm. thick was attached thermally in a known manner. A solution of tin chloride in alcohol was used to wet the face of the polyvinyl butyral and a sheet of cellulose acetobutyrate was applied thereover and squeegeed into bubble-free adherence. The dimensions of the glass face of the sandwich allowed the edges of the glass layer to project beyond the organic layers sufficiently to be mounted in the windshield frame, as described hereinabove.

EXAMPLE 2

A preferred method of joining the parts of the windshield is to enclose the parts, the glass and organic layers and the adhesives duly and correctly assembled and aligned within a plastic sack, and to evacuate the sack while applying air pressure to the outside of the sack at a temperature suited to the operation. Such a process is recited in detail in the application for patent identified as Oustin and Krumm, Ser. No. 10,911, filed Feb. 12, 1970, which is assigned to this assignee. This will, in many cases, involve an initial temperature of 140°C., 4 to 10 atmospheres pressure, the progressive reduction of temperature to 50°C., and a final chill to room temperature. In the present invention it is advisable to adopt the additional step of applying a glass pressure plate having the same curvature as the final article over the outer plastic layer of the sandwich, to be removed after the joining of the layers has been completed. The product of this process is superior in function and superior in optical properties to prior products adapted to such use.

It is sometimes useful to attach the two organic layers one to the other before applying them to the layer of glass or to assemble the parts one by one but the preferred process is as stated in Example 2. In the preferred form of the invention the cellulosic layer will then receive a coating of an organo polysiloxane to protect its surface against abrasion, or the protective layer can be applied before the organic layers are mounted on the glass. The preferred form of the invention will thus have five layers—the glass, the polyvinyl butyral, the adhesive, the cellulose ester, and the siloxane. In cases where the sandwich is not liable to be scratched the siloxane may be omitted. In cases where maximum adhesion is not necessary the layer of internal adhesive may be omitted.

Another process for assembling the windshield takes into consideration the thickness and small rigidity of the cellulose aceto-butyrate, which is applied to a sheet of glass of suitable curvature, or to a preformed plastic plate (e.g. 2 mm. thick) of any suitable transparent plastic, for instance another sheet of polyvinyl butyral. A suitable temperature for attaching the organic layers one to the other is 135°C. In general, the mounting of a sheet of plastic on bent glass (e.g. on a glass sheet of double curvature, that is to say a curvature about more than one axis producing the so-called wraparound windshield) is not difficult, the sheet of cellulose acetobutyrate being sufficiently plastic and bendable at this temperature to accommodate itself to the curvature of the glass without difficulty, if the curvature about one of the two axes does not exceed a certain limit.

The windshields of this novel construction comply with the legal requirements for safety glass, their resistance to perforation is extremely high and they break off at the edges upon the application of relatively slight impact against the plastic side. The thin plastic is tough, resists penetration by glass shards, and protects the head of a person projected against the windshield against cutting even when the glass breaks. The forces of reaction which cause such damage to the human organism when prior safety glass is used are minimized, and even when the layers involve one of glass and two of plastic, for instance a windshield having an outer sheet of glass 3 mm. thick, and an outer sheet of transparent polyamide 1 mm. thick sandwiched by polyvinyl butyral 0.76 mm. thick, the forces of reaction are reduced by one half. There are other advantages such as reduction by weight and improvement of optical qualities.

As many apparently widely different embodiments of the present invention may be made without departing from the spirit and scope thereof, it is to be understood that the invention is not limited to the specific embodiments.

What is claimed is:

1. A windshield consisting essentially of a glass sheet, an interlayer of polyvinyl butyral adhered to one surface of the glass sheet, and a cellulose ester layer selected from the group consisting of cellulose acetobutyrate, cellulose aceto-propionate and cellulose tripropionate adhered to and over the other surface of the polyvinyl butyral interlayer.

2. A windshield according to claim 1, and a coating of organo-polysiloxane on the otherwise exposed surface of the cellulose ester layer.

3. A windshield according to claim 1 in which the polyvinyl butyral and cellulose ester layers have dimensions which leave a rim of the glass sheet projecting beyond their edges.

4. A windshield according to claim 3 in which the layer of cellulose ester is about 0.2 to about 0.5 mm. thick and the polyvinyl butyral layer has a minimum thickness of about 0.7 mm.

5. A windshield which consists essentially of an exterior first layer of glass, a transparent cellulosic ester second layer selected from the group consisting of cellulose aceto-butyrate, cellulose aceto-propionate and cellulose tripropionate and a third layer of polyvinyl butyral interposed between and adhered to said first and second layers, said second and third layers being superposed and essentially covering one surface of said first layer.

6. A windshield according to claim 5 in which said glass layer projects a limited distance beyond the periphery of said second and third layers, and a mounting frame surrounding the windshield and attached essentially solely to the projecting portion of said glass layer.

7. A windshield according to claim 5 in which said second and third layers are adhered by means of a solution in alcohol of an adhesion promoter selected from tin chloride, gamma-aminopropyltriethoxysilane and gamma-glycidoxypropyltrimethoxysilane applied to at least one of the interfaces of said second and third layers.

8. The method of adhesively joining the organic layers of a laminated windshield comprising a first outer layer of glass, an interlayer of polyvinyl butyral, and a second outer layer selected from the group consisting of cellulose aceto-butyrate, cellulose aceto-propionate and cellulose tripropionate, which comprises coating with an alcoholic solution of one of the substances selected from the group of tin-II-chloride, gamma-aminopropyltriethoxysilane and gamma-glycidoxypropyltrimethoxysilane at least one of the interfaces between the interlayer and the second layer, and heating and pressing together the interfaces.

9. The method of claim 8, and coating the exposed face of the second outer layer with an organo polysiloxane.

10. A method of making a safety windshield which comprises, adhesively connecting in superposed relation an interlayer of polyvinyl butyral, a first outer layer of glass and a second outer layer selected from the group consisting of cellulose aceto-butyrate, cellulose aceto-propionate and cellulose tripropionate, the interlayer and second layer having peripheral dimensions less than those of the first layer, thereby providing a projecting rim of uncovered glass for attachment to a mounting frame, and coating the interfaces of the cellulosic second layer and the polyvinyl butyral interlayer with an adhesion promotor selected from the group consisting of tin chloride, gamma-aminopropyltriethoxysilane and gamma-glycidoxypropyltrimethoxysilane.

11. A method according to claim 10 having the added step of coating the outer face of the second outer layer with an organo polysiloxane.

* * * * *